United States Patent
Tamhankar et al.

(10) Patent No.: US 6,458,334 B1
(45) Date of Patent: Oct. 1, 2002

(54) CATALYTIC PARTIAL OXIDATION OF HYDROCARBONS

(75) Inventors: Satish S. Tamhankar, Scotch Plains; Narayanan Ramprasad; YuDong Chen, both of Bridgewater; Mark S. Tomczak, Belle Mead, all of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/517,830

(22) Filed: Mar. 2, 2000

(51) Int. Cl.[7] ............................. C01B 31/18; C01B 3/26
(52) U.S. Cl. ..................................... 423/418.2; 423/651
(58) Field of Search ........................ 423/418.2, 651, 423/245.3; 252/373; 502/304

(56) References Cited

U.S. PATENT DOCUMENTS

| | | |
|---|---|---|
| 4,048,091 A | 9/1977 | Barnaba |
| 4,522,894 A | 6/1985 | Hwang et al. |
| 4,844,837 A | 7/1989 | Heck et al. |
| 4,897,253 A | 1/1990 | Jenkins |
| 5,368,835 A | 11/1994 | Choudhary et al. |
| 5,441,581 A | 8/1995 | Van den Sype et al. |
| 5,510,056 A | 4/1996 | Jacobs et al. |
| 5,639,401 A | 6/1997 | Jacobs et al. |
| 5,648,582 A | 7/1997 | Schmidt et al. |
| 5,658,497 A | 8/1997 | Kumar et al. |
| 5,785,774 A | 7/1998 | Van den Sype et al. |
| 5,856,585 A | 1/1999 | Sanfilippo |
| 5,883,138 A | 3/1999 | Hershkowitz et al. |
| 5,976,721 A | 11/1999 | Limaye |
| 6,051,162 A | 4/2000 | Van den Sype |

FOREIGN PATENT DOCUMENTS

| | | | |
|---|---|---|---|
| EP | 303438 A2 | | 2/1989 |
| EP | 0 548 679 A1 | | 6/1993 |
| EP | 0 640 561 A1 | | 3/1995 |
| GB | 1399137 | | 6/1975 |
| WO | 93/01130 | * | 1/1993 |
| WO | 98/35908 | * | 8/1998 |
| WO | WO 99/35082 | | 7/1999 |
| WO | 99/35082 | * | 7/1999 |
| WO | WO 99/48805 | | 9/1999 |

OTHER PUBLICATIONS

Sintered Ceria: A New Dense and Fine Grained Ceramic Material by J.F. Baumard, C. Gault and A. Argoitia; Journal of the Less–Common Metals, 127 (1987) 125–130, no month.

K. Otsuka, T. Ushiyama and I. Yamanaka, "Partial Oxidation of Methane Using the Redox of Cerium Oxide", Chemistry Letters, pp. 1517–1520, 1993, no month.

E. S. Putna, J. Stubenrauch, J. M. Vohs, and R. J. Gorte, "Ceria–Based Anodes for the Direct Oxidation of Methane in Solid Oxide Fuel Cells", Langmuir, vol. 11, No. 12, 1995, pp. 4832–4837, no month.

* cited by examiner

*Primary Examiner*—Steven Bos
(74) *Attorney, Agent, or Firm*—Wan Yee Cheung; Salvatore P. Pace

(57) ABSTRACT

A process for the partial oxidation of hydrocarbons, such as methane, to produce hydrogen and carbon monoxide is provided. The process is conducted by contacting a mixture of a hydrocarbon-containing gas and an oxygen-containing gas in the presence of a metal catalyst at high gas velocities and low reaction initiation temperatures. The metal catalyst is a transition metal selected from the group of nickel, cobalt, iron, platinum, palladium, iridium, rhenium, ruthenium, rhodium, osmium and combinations thereof supported on a ceria monolith. Less than 3% by volume of carbon dioxide is present in the product gas.

22 Claims, No Drawings

CATALYTIC PARTIAL OXIDATION OF HYDROCARBONS

FIELD OF THE INVENTION

The present invention relates to the partial oxidation of hydrocarbons, and more particularly, to the partial oxidation of hydrocarbons to produce hydrogen and carbon monoxide in the presence of a metal catalyst at high gas space velocities and low reaction initiation temperatures. The catalyst is comprised of certain transition metals or combinations thereof on a ceria monolith support.

BACKGROUND OF THE INVENTION

The conversion of hydrocarbons to hydrogen and carbon monoxide containing gases is well known in the art. Examples of such processes include catalytic steam reforming, autothermal catalytic reforming, catalytic partial oxidation and non-catalytic partial oxidation. Each of these processes has advantages and disadvantages and produce various ratios of hydrogen and carbon monoxide, also known as synthesis gas. The present invention is directed to a catalytic partial oxidation process.

Partial oxidation processes are also well known and the art is replete with various catalytic partial oxidation processes. Partial oxidation is an exothermic reaction wherein a hydrocarbon gas, such as methane, and an oxygen-containing gas, such as air, is contacted with a catalyst at elevated temperatures to produce a reaction product containing high concentrations of hydrogen and carbon monoxide. The catalysts used in these processes are typically noble metals, such as platinum or rhodium, and other transition metals, such as nickel on a suitable support.

Partial oxidation processes convert hydrocarbon containing gases, such as natural gas or naphtha to hydrogen, carbon monoxide and other trace components such as carbon dioxide, water and other hydrocarbons. The process is typically carried out by injecting preheated hydrocarbons and an oxygen-containing gas into a combustion chamber where oxidation of the hydrocarbons occurs with less than stoichiometric amounts of oxygen for complete combustion. This reaction is conducted at very high temperatures, such as in excess of 700° and often in excess of 1,000° C., and pressures up to 150 atmospheres. In some reactions, steam or carbon dioxide can also be injected into the combustion chamber to modify the synthesis gas product and to adjust the ratio of hydrogen to carbon monoxide.

More recently, partial oxidation processes have been disclosed in which the hydrocarbon gas is contacted with the oxygen-containing gas at high space velocities in the presence of a catalyst such as a metal deposited on a monolith support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like. During operation of these reactions, the hydrocarbon feed gases and oxygen-containing gases are initially contacted with the metal catalyst at temperatures in excess of 400° C., typically in excess of 600° C., and at a standard gas hourly space velocity (GHSV) of over 100,000 $hr^{-1}$.

A significant drawback of all of these prior art partial oxidation processes is that they require an external source of heat to initiate the partial oxidation reaction. As stated above, the partial oxidation reaction is exothermic and once the reaction is started, the heat of the reaction will maintain the elevated temperature without the addition of external heat energy. However, since the process requires temperatures in excess of 400° C. to start or initiate the reaction, an external heat source is still required. Of course, this requires additional capital costs and adds engineering complexities to the process thereby reducing its commercial attractiveness. To attempt to address this issue, some prior processes have employed special initiator compounds to decrease the initiation temperature. For example, U.S. Pat. No. 4,879,253 discloses the use of methanol as an initiating compound to reduce the initiating temperature in the range of 100° to 500° C. However, the inventive process can be initiated at low temperatures in the absence of a low temperature initiating compound.

The present invention provides an improved partial oxidation process in which the initiation temperature can be below 400° C., preferably less than 200° C. and most preferably below 120° C. The present process either reduces or eliminates the need for an external heat source to initiate the reaction thereby increasing the commercial attractiveness of the process. The present process also has been found to exhibit a higher conversion of hydrocarbon to synthesis gas than conventional partial oxidation processes with only trace amounts of carbon dioxide and water.

SUMMARY OF THE INVENTION

The present invention provides an improved process for the catalytic partial oxidation of hydrocarbons to produce hydrogen and carbon monoxide and less than 3% carbon dioxide. Accordingly, the process permits the reaction to be initiated at lower temperatures than previously possible, thereby reducing operating and capital costs. The inventive process employing a metal catalyst on a ceria monolith support also exhibits high conversions of hydrocarbons to synthesis gas.

In one aspect, the invention provides a process for the partial oxidation of hydrocarbons to produce hydrogen and carbon monoxide comprising contacting a mixture of a hydrocarbon-containing feed gas and an oxygen-containing feed gas with a catalytically effective amount of a reduced metal catalyst consisting essentially of a transition metal selected from the group of nickel, cobalt, iron, platinum, palladium, iridium, rhenium, ruthenium, rhodium, osmium and combinations thereof supported on or in a ceria monolith support at a pressure of between 1 and 20 atmospheres, a feed gas standard gas hourly space velocity of about 50,000 to about 500,000 $hr^{-1}$, and a linear velocity of about 0.5 to 5.0 feet per second (f/s).

In another aspect, this invention provides a process for the partial oxidation of hydrocarbons to produce hydrogen and carbon monoxide which can be initiated at temperatures of less than 400° C. by contacting a metal catalyst consisting essentially of a transition metal selected from the group of nickel, cobalt, iron, platinum, palladium, iridium, rhenium, ruthenium, rhodium and osmium and combinations thereof supported on or in a ceria monolith support with a reducing environment to substantially reduce the metal catalyst (including the ceria monolith support) and then subsequently contacting the substantially reduced metal catalyst with a mixture of a hydrocarbon-containing feed gas and an oxygen-containing feed gas at a standard gas hourly space velocity of between about 50,000 and about 200,000 hr–1.

DETAILED DESCRIPTION OF THE INVENTION

The present invention provides an improved process for the partial oxidation of hydrocarbons by contacting a mixture of hydrocarbon-containing gas and an oxygen-containing gas with a catalytically effective amount of a reduced metal catalyst. The present process provides high yields of synthesis gas and less than 3% (by volume) carbon dioxide.

The hydrocarbon-containing feed gas, which can be used with the present invention, will typically contain $C_1$–$C_8$ alkanes or alkenes with the $C_1$–$C_4$ alkanes preferred and methane most preferred. Of course, natural gas and certain refinery off gases containing methane or higher hydrocarbons can be employed. Alternatively, fuel oil, crude oil and other sources of fuel may be adapted for use in the present process. The oxygen-containing gas is typically air, but can include air enriched with oxygen, oxygen mixed with other gases, or even pure oxygen.

The hydrocarbon-containing feed gas and the oxygen-containing feed gas can be in various ratios in the feed gas mixture. The precise mixture of feed gases introduced into the reaction zone will depend on the particular hydrocarbons chosen and the amount of oxygen necessary to conduct the partial oxidation reaction. Operable ratios can be easily determined by one skilled in the art. For the production of synthesis gas from natural gas or methane, it is preferred that the volumetric ratio of natural gas to oxygen present in the feed gas mixture exhibit a carbon to oxygen ratio from about 0.5 to 2.0, and more preferably from about 1.6 to 1.9.

The metal catalysts employed in the present invention are a monolith support structure composed of ceria and coated or impregnated with a transition metal or combinations thereof. As used herein, "metal catalyst" refers to the entire catalyst structure including the metal and the monolith support.

The monolith support is generally a ceramic foam-like structure formed from a single structural unit wherein the passages are disposed in either an irregular or regular pattern with spacing between adjacent passages. The single structural unit is used in place of conventional particulate or granulate catalysts which are less desirable in the present process. Examples of such irregular patterned monolith supports include filters used for molten metals. Examples of regular patterned supports include monolith honeycomb supports used for purifying exhausts from motor vehicles and used in various chemical processes. Preferred are the ceramic foam structures having irregular passages.

Both types of monolith supports are well known and commercially available from, among others, Corning, Inc.; Vesuvius Hi-Tech Ceramics, Inc.; and Selee Corp.

The monolith support used in the present invention is made from ceria (cerium dioxide) but can be a mixture of cerium oxides such as cerium monoxide and cerium dioxide. As used herein, the term "ceria" shall include not only substantially pure compositions of cerium oxides but also includes composites or mixtures of other refractory or ceramic materials in combination with ceria wherein the ceria component is greater than 75%, and preferably 90%, of the total composition by weight. Examples of such materials include, but are not limited to, ziconia, alumina, yttria and mixtures thereof. Preferably the ceria monolith used herein will have a porosity of between 30 and 70 pores per inch.

The ceria monolith supports have been surprisingly found to be superior to conventional monolith supports made from other ceramic materials such as zirconia and mixtures of such materials wherein ceria is present in less than 75% of the total composition by weight. Ceria is known to have oxygen storage capacity and it can exchange a certain quantity of oxygen atoms from its structure with the surrounding atmosphere, depending on the availability or lack of oxygen in the surrounding. When oxygen-starved in this manner, it has been found to have a very strong affinity for oxygen, and the subsequent oxygen uptake can be exothermic, generating localized high temperatures. Also, in the presence of ceria, the metal remains in a substantially reduced form thereby rendering it catalytically more active. It is believed that this occurs since ceria preferentially picks up oxygen first.

As with conventional refractory or ceramic monolith support materials, the present ceria monolith supports are prepared by casting and firing at high temperatures as known in the art. The monolith support is normally then contacted with a wash coat of either the same or modified refractory material to increase the surface area within the monolith support and to increase the subsequent metal loading. Typically, the wash coat will increase the surface area of the support from about 1 to about 10 meter$^2$/gram. Various ceramic foam structures and their preparation are described in the art and are generally known, and the same preparation techniques can be used here with the ceria supports.

The metals used in the present catalysts are selected from certain transition metals of the Periodic Table of Elements. Suitable transition metals include nickel, cobalt, iron, platinum, palladium, iridium, rhenium, ruthenium, rhodium and osmium, with platinum, palladium and rhodium being preferred. More preferred are nickel and rhodium. The most preferred metal of this group is rhodium. The metals may be present on the monolith support in the form of metals, metal oxides, metal halides or other metal salts prior to being reduced. Upon reduction, as described below, the metals will be substantially in the metallic form. Generally, from 1 to 20 % by weight of the metal will be deposited on the monolith support (based on the weight of the monolith) and preferably from 6 to 10% by weight.

The metal is impregnated into the monolith support using conventional processes. For example, the ceria monolith supports are impregnated with a saturated metal salt solution and allowed to dry at room or elevated temperatures. The support is then calcined under suitable conditions as generally known to the skilled artisan.

The metal catalyst should be in a reduced state prior to use in the partial oxidation process, and the reduction can be carried out by contacting it with a reducing environment, preferably at an elevated temperature. Both the metal and ceria support should be substantially reduced. The reduction should be sufficient to remove the mobile oxygen from the support and bound oxygen from metal. It was found that when the reduction is carried out in substantially pure hydrogen at greater than about 400° C., the catalyst is sufficiently reduced to initiate the partial oxidation reaction at lower temperatures then previously possible. The degree of reduction of the catalyst is indicated by the speed of pickup of oxygen by the reduced catalyst when exposed to an oxygen containing atmosphere. If the catalyst is not sufficiently reduced, the reaction does not start until a temperature of greater than 400° C. is reached.

The partial oxidation process is conducted by contacting mixtures of the hydrocarbon-containing feed gas and the oxygen-containing feed gas with the metal catalyst at contact times ranging from 1 to 500 milliseconds depending on the particular feed gases, catalyst, pressure and space velocity employed. Under typical operating conditions, the feed gas will be introduced at a standard gas hourly space velocity of between about 50,000 and about 500,000 hr$^{-1}$ and preferably 100,000 to 200,000 hr$^{-1}$. The linear space velocity is about 0.5 to 5.0 feet per second. The process is conducted at pressures from about 1 to about 20 atmospheres and preferably 1 to 5 atmospheres (atm). Generally, it has been found that higher space velocities can be employed with higher concentrations of oxygen in the oxygen-containing feed gas.

When the inventive process is carried out with air and methane in the feed gas mixture having a carbon to oxygen ratio of about 1.7, at a pressure of about 1.5 atm. and at a standard gas hourly space velocity of 120,000 $hr^{-1}$, a gas mixture containing about 40% (by volume) nitrogen, 36% hydrogen, 18% carbon monoxide and trace amounts of methane, carbon dioxide and water is produced at about 800° C. The product gas contains less than 3% carbon dioxide and preferably less than 1% carbon dioxide.

As mentioned above, the metal catalyst is a singular unit of varying dimensions depending on the size and design of the reactor. In a preferred embodiment, the reactor is a pipe or tube of suitable material and construction having a diameter of between about 1 and 100 inches. The feed gas mixture is fed into one end and the partial oxidation reaction occurs on the metal catalyst with the product gas exiting from the other end. The metal catalyst can also be comprised of multiple monolith units to form an assembly of units disposed in end-to-end arrangements. It is preferred that the metal catalyst have a porosity and orientation so as to minimize the pressure drop of the feed gas through the catalyst. Moreover, multiple individual reactors can be used to form an assembly of reactors disposed in a side-by-side arrangement for increased production. For example, multiple pipes or tubes can be packed together as an assembly to form a single reactor unit with each individual pipe containing the metal catalyst.

The partial oxidation process of the present invention utilizing the metal catalyst permits the reaction to be initiated at temperatures below 400° C., preferably below 200° C. In order to start the reaction at low temperatures, it is important that the metal catalyst be in the substantially reduced form prior to contacting the catalyst with the feed gas mixture. It has been found that temperatures of less than 120° C. can be employed under certain conditions such as when high oxygen concentrations are used in the feed gas mixture and the metal catalyst is substantially reduced. In the most preferred embodiment, the partial oxidation reaction is initiated at temperatures of less than 120° C.

In another embodiment of the present invention, the metal catalyst is reduced in situ by exposing the metal catalyst to an exothermic reaction in the presence of a reducing environment prior to conducting the partial oxidation reaction. For example, the metal catalyst can be contacted with a mixture of 4 to 10% hydrogen and 1 to 2% oxygen in nitrogen at a gas hourly space velocity of between 4000 and 10,000 $hr^{-1}$, and at temperatures of less than about 200° C., preferably at room temperature. Since the hydrogen/oxygen reaction is highly exothermic, it heats up the catalyst. Furthermore, by having an excess of hydrogen in the feed mixture, a reducing atmosphere is rendered, so that the catalyst is reduced at the elevated temperature. Such a reaction will reduce the metal catalyst while at the same time elevate the temperature of the metal catalyst to a level at which the partial oxidation reaction can be initiated. Once the metal catalyst reaches the initiation temperature, the reaction is initiated by contacting the feed gas mixture with the metal catalyst. The use of such a reaction will eliminate the need for an external heat source thereby reducing the capital costs of the process. As the partial oxidation process commences, the reaction will continue to transfer heat energy to the catalyst raising the temperature of the catalyst to a range of about 500° to 1000° C.

As mentioned above, it has also been found that when the metal catalyst is more completely reduced, the reaction can be initiated at lower temperatures. Thus, it is preferred that the metal catalyst be substantially reduced in order to initiate the reaction at temperatures below 120° C.

It has also been surprisingly observed that, when using the inventive process, the conversion of methane to hydrogen and carbon monoxide is in the range of about 10% to 15% higher than would be expected from conventional partial oxidation processes. Most importantly, the production of unwanted components, especially carbon dioxide, is minimized.

The following examples illustrate the improved partial oxidation process of the present invention. were conducted.

EXAMPLE 1

A ceria monolith with a ceria washcoat having from 30 to 70 pores per inch, and obtained from Vesuvius Hi-Tech Ceramics, was impregnated with 6.4 % by weight of rhodium metal to prepare the metal catalyst. The reactor containing the metal catalyst monolith was purged with nitrogen gas at 400° C. for 15 minutes and then cooled to about 110° C., still in the presence of nitrogen gas.

A gas mixture containing 45.1% by volume of methane, 26.2% by volume of oxygen and 28.7% by volume of nitrogen then was passed into the reactor containing the metal catalyst at a space velocity of 70,000 $hr^{-1}$ and a temperature of about 110° C. The reaction was initiated at this temperature and there resulted a rapid rise in the reactor temperature to above 800° C. with the production of hydrogen and carbon monoxide.

EXAMPLE 2

The metal catalyst produced in Example 1 was purged with pure hydrogen gas at 200° C. for about 30 minutes in a reactor, then the reactor was cooled to about 50° C. while still in the presence of hydrogen gas. The reaction mixture employed in Example 1 was then passed over the metal catalyst at a space velocity of 70,000 $hr^{-1}$ and a temperature of 50° C. The partial oxidation reaction commenced at this temperature and the reactor temperature rapidly rose to above 800° C. with the production of hydrogen and carbon monoxide.

COMPARATIVE EXAMPLE A

A metal catalyst was prepared as described in Example 1, except the monolith support was made of zirconia (also commercially obtained from Vesuvius Hi-Tech Ceramics). The same amount of rhodium metal was loaded on the zirconia support.

When attempting to start the reaction by following the procedures described in Example 1 using a hot nitrogen purge or Example 2 using a hot hydrogen purge, the reaction could not be initiated until a temperature of about 350° C. was reached.

EXAMPLE 3

A partial oxidation reaction was initialed following the same procedure as described in Example 1 with the same metal catalyst which was used in Examples 1 and 2. A gaseous mixture containing 14.2% by volume of oxygen, 60.2% by volume of nitrogen and 25.6% by volume of methane was then fed to the reactor containing the monolith catalyst (instead of the mixture which was used to initiate the reaction) at a space velocity of 120,000 hr$^{-1}$. The reaction temperature remained about 700° C. The resulting product gas contained 27.4% hydrogen, 13.3% carbon monoxide and 48.7% nitrogen, 2.7% carbon dioxide, 5.8% methane and 2.1% water. The conversion rate of methane and the yield of hydrogen and carbon monoxide were calculated from the measured concentrations in the product. The results are shown in Table 1 below.

COMPARATIVE EXAMPLE B

A comparative example was prepared as described in Example 3 except the monolith support was made of zirconia (also commercially obtain from Vesuvius Hi-Tech Ceramics). The reaction was initiated at about 350°. The conversion and yield measurements were calculated as in Example 3 and the results are shown in Table 1.

TABLE 1

|  | CH$_4$ Conversion | Yield [(H$_2$ + CO)/CH4] |
|---|---|---|
| Example 3 | 86.2% | 2.34 |
| Comparative Example B | 76.2% | 2.02 |

Examples 1 and 2 illustrate that the partial oxidation reaction was initiated at temperatures below 120° C. when using the inventive process. As shown in Table 1, the present process employing rhodium supported on a ceria monolith exhibited higher methane conversion rates than rhodium supported on a zirconia monolith. In addition, the yield of hydrogen and carbon monoxide (synthesis gas) was appreciably higher for the inventive process.

It should be understood that the subject invention is not limited by the examples set forth above. The scope of this invention is intended to include equivalent embodiments, modifications and variations falling within the scope of the attached claims.

What is claimed is:

1. A process for the partial oxidation of hydrocarbons to produce hydrogen and carbon monoxide and less than 3% carbon dioxide, the process comprising contacting a mixture of a hydrocarbon containing feed gas and an oxygen containing feed gas with a catalytically effective amount of a reduced metal catalyst consisting essentially of a metal selected from the group of nickel, cobalt, iron, platinum, palladium, iridium, rhenium, ruthenium, rhodium, osmium and combinations thereof supported on or in a ceria monolith support at a pressure of between 1 and 20 atmospheres, a feed gas standard gas hourly space velocity of about 50,000 to about 500,000 hr$^{-1}$, and a linear velocity of about 0.5 to 5.0 ft/s, wherein said partial oxidation has an initiation temperature of below 200° C.

2. The process of claim 1 wherein said metal catalyst is substantially reduced to remove mobile oxygen from said ceria monolith support and bound oxygen from said metal.

3. The process of claim 1 wherein said partial oxidation is initiated at a temperature of below 120° C.

4. The process of claim 2 wherein said partial oxidation occurs in the absence of a low temperature initiating compound.

5. The process of claim 1 wherein said catalyst is reduced in situ.

6. The process of claim 5 wherein said catalyst is reduced in situ by exposure to a reducing environment comprising a gas mixture containing hydrogen and oxygen.

7. The process of claim 1 wherein said metal is selected from nickel and rhodium.

8. The process of claim 7 wherein said metal is rhodium.

9. The process of claim 1 wherein said space velocity is from 100,000 to 200,000 hr$^{-1}$.

10. The process of claim 1 wherein said hydrocarbon is methane or natural gas.

11. A process for the partial oxidation of hydrocarbons to produce hydrogen and carbon monoxide and less than 3% carbon dioxide having an initiation temperature less than 200° C. comprising first contacting a metal catalyst consisting essentially of a metal selected from the group of nickel, cobalt, iron, platinum, palladium, iridium, rhenium, ruthenium, rhodium, osmium and combinations thereof supported on or in a ceria monolith support with a reducing environment to reduce said metal catalyst and subsequently contacting said reduced metal catalyst with a mixture of a hydrocarbon containing feed gas and an oxygen containing feed gas at a standard gas hourly space velocity of about 50,000 to about 200,000 hr$^{-1}$.

12. The process of claim 11 wherein said reducing environment is a hydrogen containing gas at temperatures of less than 200° C.

13. The process of claim 11 wherein said reducing environment is established by an exothermic reaction.

14. The process of claim 13 wherein said exothermic reaction is a hydrogen and oxygen reaction.

15. The process of claim 11 wherein said partial oxidation occurs without the need for an external heat source.

16. The process of claim 15 wherein said partial oxidation occurs in the absence of a low temperature initiating compound.

17. The process of claim 11 wherein said metal is selected from nickel and rhodium.

18. The process of claim 11 wherein said hydrocarbon is methane or natural gas.

19. The process of claim 11 wherein said feed gas consists essentially of a C$_1$ to C$_4$ alkane and an oxygen-containing gas.

20. The process of claims 1 or 11 wherein said ceria monolith support is comprised of at least 75% by weight ceria.

21. The process of claim 20 wherein the metal is nickel or rhodium.

22. The process of claim 20 wherein said metal catalyst is substantially reduced to remove mobile oxygen from said ceria monolith support and bound oxygen from said metal.

* * * * *